United States Patent [19]

Taylor et al.

[11] 4,445,118
[45] Apr. 24, 1984

[54] NAVIGATION SYSTEM AND METHOD

[75] Inventors: Ralph E. Taylor, Silver Spring, Md.; James W. Sennott, Bloomington, Ill.

[73] Assignee: The United States of America as represented by the Administrator of the National Aeronautics and Space Administration, Washington, D.C.

[21] Appl. No.: 266,253

[22] Filed: May 22, 1981

[51] Int. Cl.³ ............................................. H04B 7/185
[52] U.S. Cl. ..................................... 343/357; 343/356
[58] Field of Search .................. 343/100 ST, 113 DE, 343/357, 418, 356; 364/449

[56] References Cited

U.S. PATENT DOCUMENTS

| | | | |
|---|---|---|---|
| 3,384,891 | 5/1968 | Anderson | 343/100 ST |
| 3,430,234 | 2/1969 | Wright | 343/102 |
| 3,471,856 | 10/1969 | Laughlin | 343/100 ST |
| 3,544,995 | 12/1970 | Bottenberg | 343/100 ST |
| 3,641,433 | 2/1972 | Mifflin et al. | 343/6.5 |
| 3,763,492 | 10/1973 | Easton | 343/100 ST |
| 3,789,409 | 1/1974 | Easton | 343/100 ST |
| 3,852,750 | 12/1974 | Klein | 343/100 ST |
| 3,906,204 | 9/1975 | Rigdon | 343/100 ST |

OTHER PUBLICATIONS

"Spread Spectrum Systems," R. C. Dixon, John Wiley & Sons, New York, 1976, pp. 186-188.

*Primary Examiner*—Theodore M. Blum
*Attorney, Agent, or Firm*—John O. Tresansky; John R. Manning; Ronald F. Sandler

[57] ABSTRACT

In a global positioning system (GPS), such as the NAVSTAR/GPS system, wherein the position coordinates of user terminals (14) are obtained by processing multiple signals transmitted by a constellation of orbiting satellites (16), an acquisition-aiding signal generated by an earth-based control station (12) is relayed to user terminals via a geostationary satellite (10) to simplify user equipment. The aiding signal is FSK modulated on a reference channel slightly offset from the standard GPS channel. The aiding signal identifies satellites in view having best geometry and includes Doppler prediction data as well as GPS satellite coordinates and identification data associated with user terminals within an area being served by the control station (12) and relay satellite (10). The aiding signal significantly reduces user equipment by simplifying spread spectrum signal demodulation and reducing data processing functions previously carried out at the user terminals (14).

24 Claims, 12 Drawing Figures

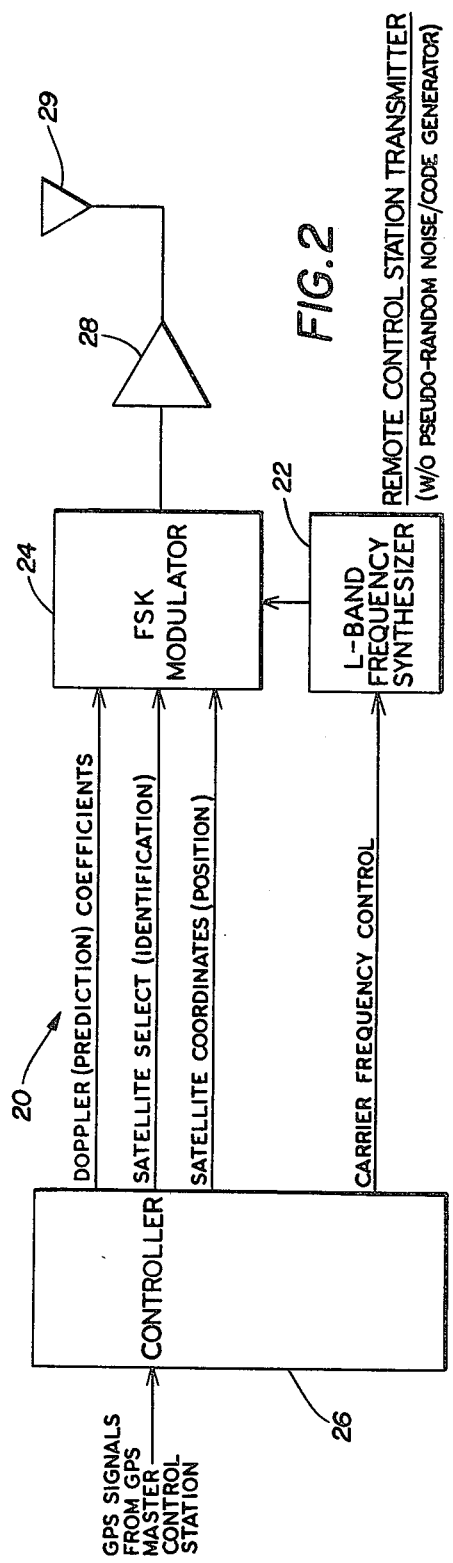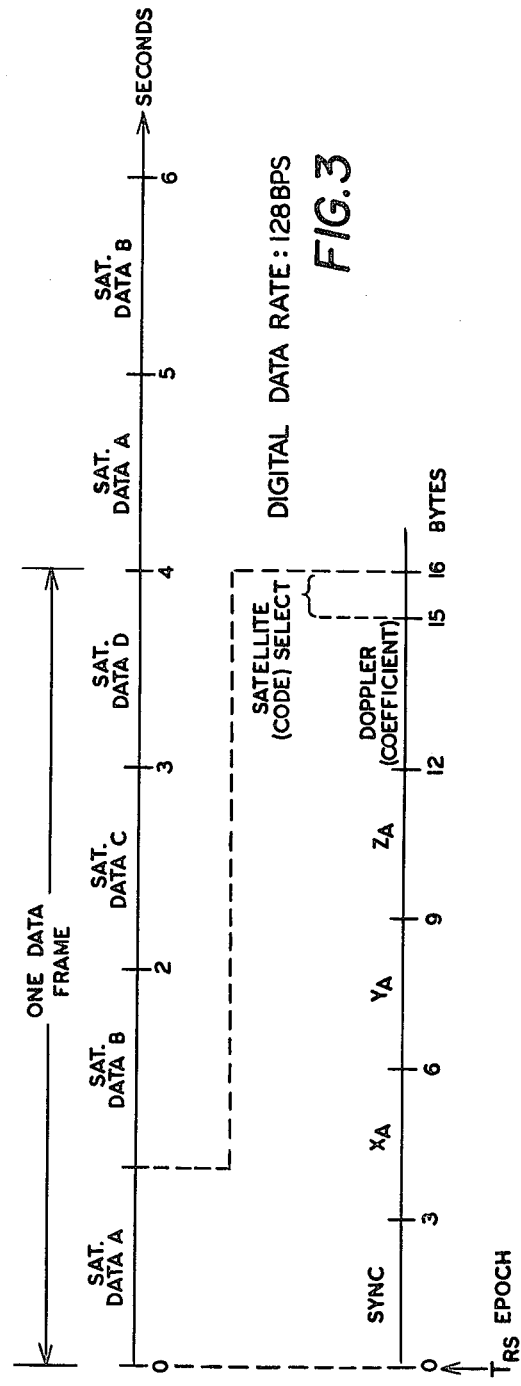

NAVIGATION SYSTEM AND METHOD

ORIGIN OF THE INVENTION

The invention described herein was made in the performance of work under a NASA contract and by an employee of the United States Government and is subject to the provisions of Section 305 of the National Aeronautics and Space Act of 1958, Public Law 85-568 (72 Stat. 435; 42 USC 2457), and may be manufactured and used by or for the Government for governmental purposes without the payment of any royalties thereon or therefor.

DESCRIPTION

1. Technical Field

The invention relates generally to navigation systems using a constellation of Earth-orbiting satellites having known positions and generating different pseudo-random noise (PRN) type signals to user terminals wherein Doppler compensated signal propagation times are measured to calculate user position and velocity, and more particularly to an augmented NAVSTAR/GPS system and method to allow for civilian applications wherein user terminals are significantly simplified by transmitting to the user terminals, on a reference channel, GPS satellite position and predicted Doppler data information as well as code and carrier acquisition aiding signals.

2. Background Art

There is presently under development a position determining system, referred to as the NAVSTAR Global Positioning System (GPS), wherein a constellation of 18 orbiting satellites transmit pseudo-random ranging signals from which users with appropriate equipment will obtain three-dimensional location, velocity and timing information anywhere on or near the surface of the Earth. Details of the NAVSTAR/GPS are given in *NAVIGATION: Journal of the Institution of Navigation,* Volume 25, Number 2, December, 1978 (entire issue). In the system that will ultimately be put into operation, the 18 satellites will be oriented in circular 10,900-nautical-mile orbits in three inclined planes. A minimum of four satellites must be and will be visible at all times. The satellites will be in 12-hour orbits and the position of each satellite at any time will be precisely known. The longitude, latitude and altitude of any point close to Earth, with respect to the center of the Earth, will be calculated by determining propagation times of electromagnetic signals from four of the satellites to the point.

A signal about a single center frequency from each of the visible satellites will be received by a user terminal at a point close to Earth to measure propagation times of the electromagnetic signals transmitted by the satellites. The satellites from which the signals originate are identified by modulating the signal transmitted from each satellite with pseudo-random coded signals. The GPS System will operate in two simultaneous modes. In one mode, referred to as the clear/acquisition (C/A) mode, the pseudo-random noise (PRN) signal is a Gold code sequence that is repeated once every millisecond to enable the position of the receiver responsive to the signals transmitted from four of the satellites to be determined to an accuracy of 100 meters. In a second mode, referred to as the precise or protected (P) mode, pseudo-random codes are transmitted with sequences that are 7-days long enabling the user terminal position to be determined to an accuracy of better than 10 meters.

In computing user terminal position, the receiver will operate in three modes, viz, signal acquisition, signal tracking and position fixing. In the acquisition mode, the receiver must know, approximately, its location and have available a recent version of the GPS almanac. For acquisition, Doppler estimates must then be computed for the subset of GPS satellites having good geometry, i.e., the four satellites with the greatest elevation, typically above 20° as observed by a given terminal. This leaves the GPS demodulator with a prior GPS carrier frequency uncertainty of several hundred hertz. For the receiver to generate locally a carrier reference to this accuracy, however, requires an oven stabilized L-Band synthesizer. To enable the receiver to separate the C/A signals received by it from the different satellites, the receiver also contains a number of different Gold code reference sources corresponding to the number of satellites in the constellation. The locally derived code and carrier references are cross-correlated with received GPS signals over one or more Gold code sequence intervals. The phase of the locally derived Gold code sequence is varied on a chip-by-chip basis and then within chip in 0.5-1.0 microsecond steps, spanning one millisecond code periods for the C/A code until the maximum cross-correlation function is obtained. The chipping rate of a pseudo-random sequence is the rate at which the individual pulses in the sequence are derived and therefore is equal to the code repetition rate divided by the number of chips in the code; one pulse of the code is referred to as a chip.

In the tracking mode, code delay is tracked continuously and an aligned or "punctual" code stream generated. This is implemented with either a delay lock loop or tau-dither technique. In either case, the result is a continuously tracked code generator with delay error maintained on the order of 0.1 microsecond. Secondly, initial Doppler uncertainty must be further reduced. This is provided by stepping the frequency synthesizer and measuring the correlator output. Once Doppler uncertainty is reduced to 10-20 Hz, carrier phase and raw GPS data messages are recovered using a Costas loop and the aforementioned punctual code.

After four locally derived Gold code sequences are locked in phase with the Gold code sequences received from the satellites in the field of view of the receiver, the position, velocity and time associated with the receiver as well as other variables of interest can, upon further local processing of the GPS data messages, be determined. Position accuracy may be obtained to about 100 meters. This data processing requires storage in the terminal of ephemeris parameters, updated hourly, together with a software model for the GPS satellite orbits, to compute, in real time, satellite coordinates for correspondence with time of arrival of GPS satellite generated pseudo-range data.

High cost of the receiver at each user terminal tends to discourage utilization of the global positioning system by small commercial or municipal users or by individuals. The high cost resides in the acquisition and tracking circuitry which includes, as afore-described, a highly stable crystal controlled local oscillator, pseudo-noise synthesizers which must generate 18 unique Gold code sequences, as well as a carrier phase tracking loop to obtain GPS data messages and a delay lock tracking loop to obtain time-of-arrival data for position determination. Furthermore, in the NAVSTAR/GPS, the receiver at each user terminal requires approximately 25,000 bytes of 16-bit microprocessor memory for GPS satellite coordinate computation from periodically updated orbit ephemeris data as well as computation of position, velocity, time and other variables of interest associated with the user terminal. Details of the characteristics of the spread spectrum signal as well as of circuitry for processing the signal are given in Dixon, R. C., *Spread Spectrum Systems,* John Wiley & Sons, New York, 1976. The pseudo-noise coding system was selected to minimize the effects of radio-frequency interference.

STATEMENT OF THE INVENTION

One object of the present invention is to provide an improved global positioning system (GPS) wherein user terminals are reduced in complexity.

Another object is to provide a new and improved global positioning system (GPS) wherein data common to a number of users in a predetermined region are obtained from a remote control station and relayed to the user terminals to augment GPS satellite transmitted data.

Another object is to provide a simplified global positioning system (GPS) wherein front-end local oscillator stability requirements of the user terminal receivers are relaxed and microprocessor memory and data processing are reduced.

Another object is to adapt the NAVSTAR/GPS system to civilian application by supplying an aiding signal to user terminals to eliminate precision front-end signal processing circuitry peculiar to military applications.

Yet another object is to adapt the NAVSTAR/GPS to civilian application without modification of the existing GPS satellite transmission equipment.

Another object is to further adapt the NAVSTAR/GPS to civilian application by supplying in an aiding signal auxiliary information of civilian interest, such as weather and hazard data peculiar to a particular user terminal location.

Still another object is to provide an improved global positioning system with relatively inexpensive user terminals.

A further object is to provide an improved navigation system supplying an aiding signal to reduce terminal receiver complexity.

A still further object is to provide an improved method for determining the position of a user terminal in a navigation system.

These and other objects are attained by use of the 18 satellite constellation NAVSTAR/GPS system which is constantly broadcasting a spread spectrum, pseudo-random code which is unique for each of the satellites, thereby resulting in a slightly different and detectable spread spectrum signal for each satellite. The nature of the system, therefore, allows for identification of the signal source. These signals are transmitted on a downlink to the user terminals. A transmitter is provided at a remote control station which accepts information from the GPS master control station and, in turn, transmits an additional frequency shift keyed FSK) signal on a reference channel to the terminals which may then determine the position or velocity of the terminal. This transmitted signal contains, in real time, GPS satellite position, data as to which GPS satellites are in best view, Doppler prediction information in terms of Doppler offset, and in one embodiment, a PRN code generator signal.

It is this additional signal that allows for greater relaxation of local oscillator and signal processing requirements for the terminal receivers which, in essence, results in a degradation of the data only with respect to position update rate vis-a-vis a classical GPS system.

To provide for greater range of system coverage, a tower or reference satellite may be provided generally for the purpose of relaying the remote control station signals which are designated as reference or aiding signals.

In one embodiment, the transmitter at the remote control station has a pseudo-random noise code generator that matches the 18 discrete codes of the GPS satellites. In another embodiment, each individual terminal includes a receiver with a pseudo-random noise generator. Where the transmitter includes the code generator, the effective isotropic radiated power (EIRP) of the transmitter, tower or reference satellite would be higher for effective reception than in the case where each receiver contains a code generator. In essence, the invention includes the concept of providing a single transmitter to provide, in turn, an additional information bearing signal, to achieve simplified terminal receivers. These receivers would be of low enough cost to make wide-spread civilian use of the GPS system economically feasible.

BRIEF DESCRIPTION OF DRAWINGS

FIG. 2 is a block diagram of circuitry for transmitting an aiding or reference signal to be received together with GPS channel signals at the user terminal;

FIG. 3 is a diagram of the reference channel data format generated by the remote control station;

FIG. 6(*b*) is a diagram showing receiver correlation peaks associated with each GPS satellite;

DETAILED DESCRIPTION OF THE INVENTION

Figure 1:
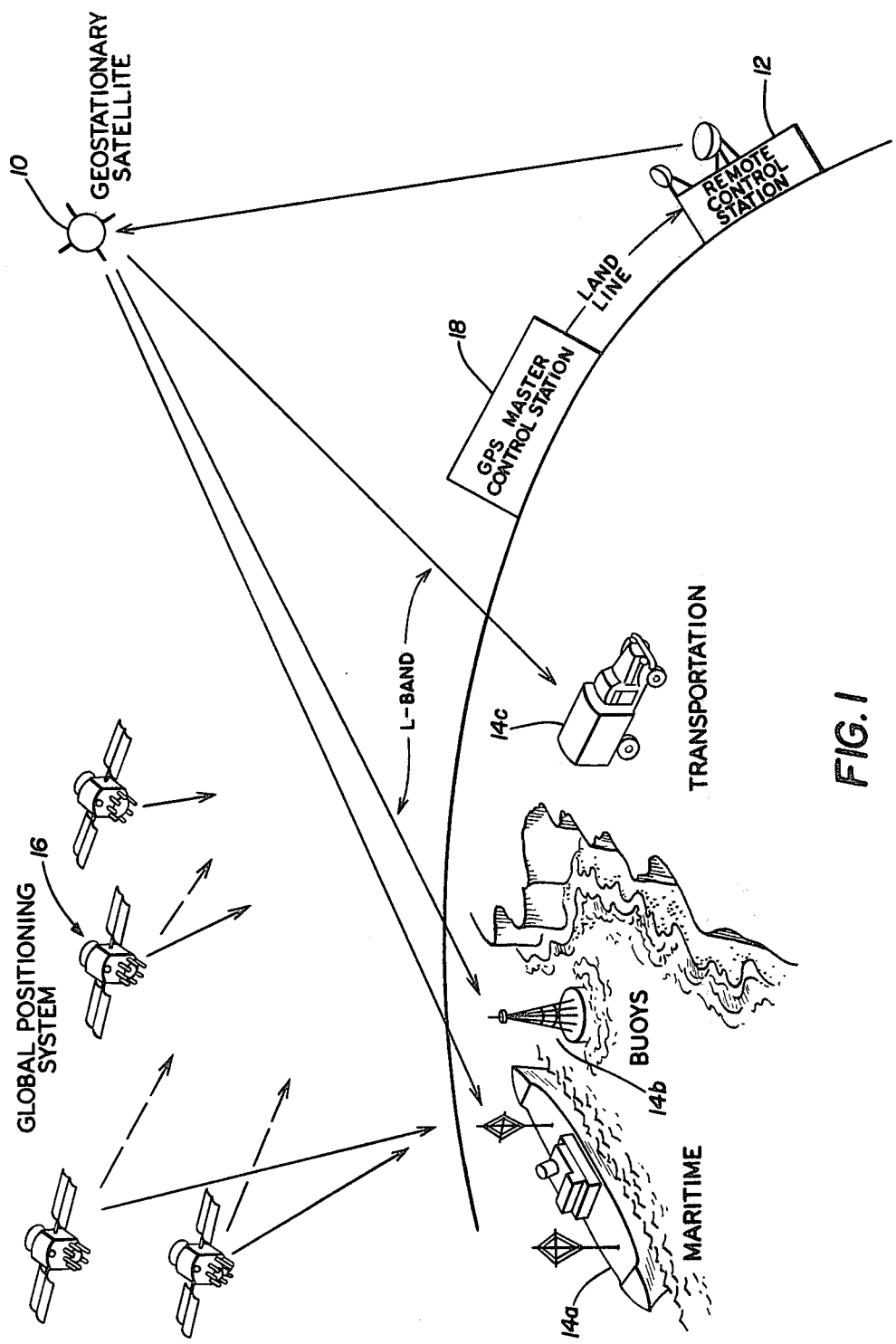
FIG. 1 is a graphical overview of the reference signal augmented global positioning system of the invention.

Referring to FIG. 1, the reference transmission aided global positioning system (GPS) of the invention is shown wherein a geostationary satellite 10 receives an aiding transmission on an auxiliary or reference channel from a ground based control station 12 to be relayed to user terminals, such as at 14a and 14b and 14c, in addition to the standard pseudo-random noise (PRN) signals transmitted on the GPS channel by a constellation of Earth orbiting GPS satellites 16. The aided GPS system has applicability not limited to the NAVSTAR/GPS.

The uplink signal between Earth-based control station 12 and geostationary satellite 10 is at an arbitrary frequency, preferably in the C-band (4–6 gigahertz) or K-band (20–30 gigahertz). The downlink signal between the geostationary satellite 10 and user terminals 14 is preferably at about 1,555 MHz which is nominally 20 MHz below the standard GPS $L_1$ center frequency of 1,575.42 MHz. The downlink carrier is FSK modulated to identify the best 4 GPS satellites 16 in view, (i.e., the four GPS satellites having the best orbital position) to carry code select data for GPS Gold code reference generators that correspond to GPS satellites visible to the user terminals and to include acquisition-aiding Doppler information. As will be explained hereinafter in detail, these signals on the reference channel provide to the user terminals information necessary to compute user position coordinates more efficiently, thereby substantially simplifying user equipment for civilian application. These functions have been performed heretofore in the conventional GPS user terminals requiring more complex circuitry, stable local oscillators, Costas and delay lock tracking loops and data processing equipment including high speed floating point capability of double precision.

These functions are performed by the remote control station 12 in a manner similar to that heretofore provided in the user terminals in the NAVSTAR/GPS. Ephemeris and up-load data for GPS satellites are obtained by a GPS master control station 18 and supplied to the remote control station 12 by land line or other means. The GPS master control station 18 is included in the existing NAVSTAR/GPS system and will therefore not be described in detail herein.

The downlink signal relayed to the user terminals by the geostationary satellite 10 consists of a narrow band carrier and a frequency shift key (FSK) data stream on a carrier having a frequency slightly below the $L_1$ frequency of the GPS channel. The difference between the two frequencies, selected at 20 MHz, must be large enough to avoid radio-frequency interference with NAVSTAR/GPS terminals receiving the $L_1$ band of the GPS terminal but sufficiently close that a common receiver antenna, receiver front-end and RF preamplifier can be used for both signals.

With reference to FIG. 2, a transmitter 20, located at the remote control station 12, includes a controller 26, an FSK modulator 24 and a high stability, L-band frequency synthesizer or oscillator 22. The input to controller 26 consists of control signals supplied as an input to the remote control station 12 by landline from the NAVSTAR/GPS master control station or, alternatively, may be furnished directly from the NAVSTAR/GPS satellites. The information contained in the signals, in either event, includes almanac data, designated as an ALMORB, which is an Almanac Orbital Elements File for each satellite, containing the following information:

1. GPS satellite SV (space vehicle) PRN signal subassembly member for satellite identification
2. orbit eccentricity
3. orbit angle of inclination
4. rate of right ascension
5. GPS SV health flag position
6. square root of the semi-major axis
7. right ascension at the reference time, i.e., time of signal arrival
8. reference argument of perigee
9. mean anomaly at the reference time
10. 0th order of the clock polynominal
11. 1st order of clock polynominal
12. (spare word)
13. time of arrival for the reference time for the Keplerian elements.

In the event the signals are transmitted by the landline, the signals typically enter the controller 26 by telephone line with a standard teletype binary format. If the signals are received directly from the NAVSTAR/GPS satellites, the same information as indicated above is contained in the signals but they would be in a QPSK (quadrature phase shift key) format at 50 b.p.s. and at an r.f. frequency of 1575.42 MHz. This signal would be demodulated in the controller 26 whereafter the derived signals would be equivalent to the landline signals. In either event, the controller includes a microprocessor or minicomputer, which is programmed with algorithms similar to those contained in the GPS standard military receivers, in order to extract Doppler coefficient (prediction) data, satellite select (identification) data, and satellite coordinate (spatial position) data, three of the controller output signals. The carrier frequency control signal is derived from the transmitter itself or from a possible remote reference channel transmitting tower or reference satellite to correct for possible r.f. drift or instability between the transmitter output, tower or satellite, and the transmitter oscillator 22. The Doppler coefficient data is a calculation of the Doppler frequency gradient for a given satellite, which is defined as Doppler cells (200 Hz wide), as further explained with reference to FIG. 6A. Satellite select data includes a PRN code identification to identify a given satellite in view. Satellite coordinate data specifies the X, Y and Z spatial coordinates for the given satellite in view. The carrier provided by synthesizer 22 is modulated by modulator 24 with the FSK data. The modulator output is boosted by a linear driver amplifier 28 before being transmitted by an antenna 29 which may be omni-directional or directional, depending on the application. The generation of this uplink signal on the C-band or K-band, followed by down-converting in frequency by relay satellite 10 to the 1,555 MHz signal on the reference channel, is not shown.

Referring to FIG. 3, the data format of the FSK signal generated in the acquisition-aiding channel is an FSK data stream in the form of a data frame having four one-second subframes corresponding, respectively, to the four GPS satellites preselected by the remote control station 12 as having the best geometry for tracking based upon minimum geometric dilution of precision (GDOP) within the region serviced by the remote control station. Each subframe contains 16 each, 8-bit bytes of data including 3 bytes each for synchronization and X, Y and Z satellite coordinate data for each visible satellite. This data is referenced to the signal frame, epoch and Doppler gradient, which identifies the frequency offset due to satellite motion, as well as a single byte for C/A code selection, to be more fully explained hereinafter.

Figure 4:
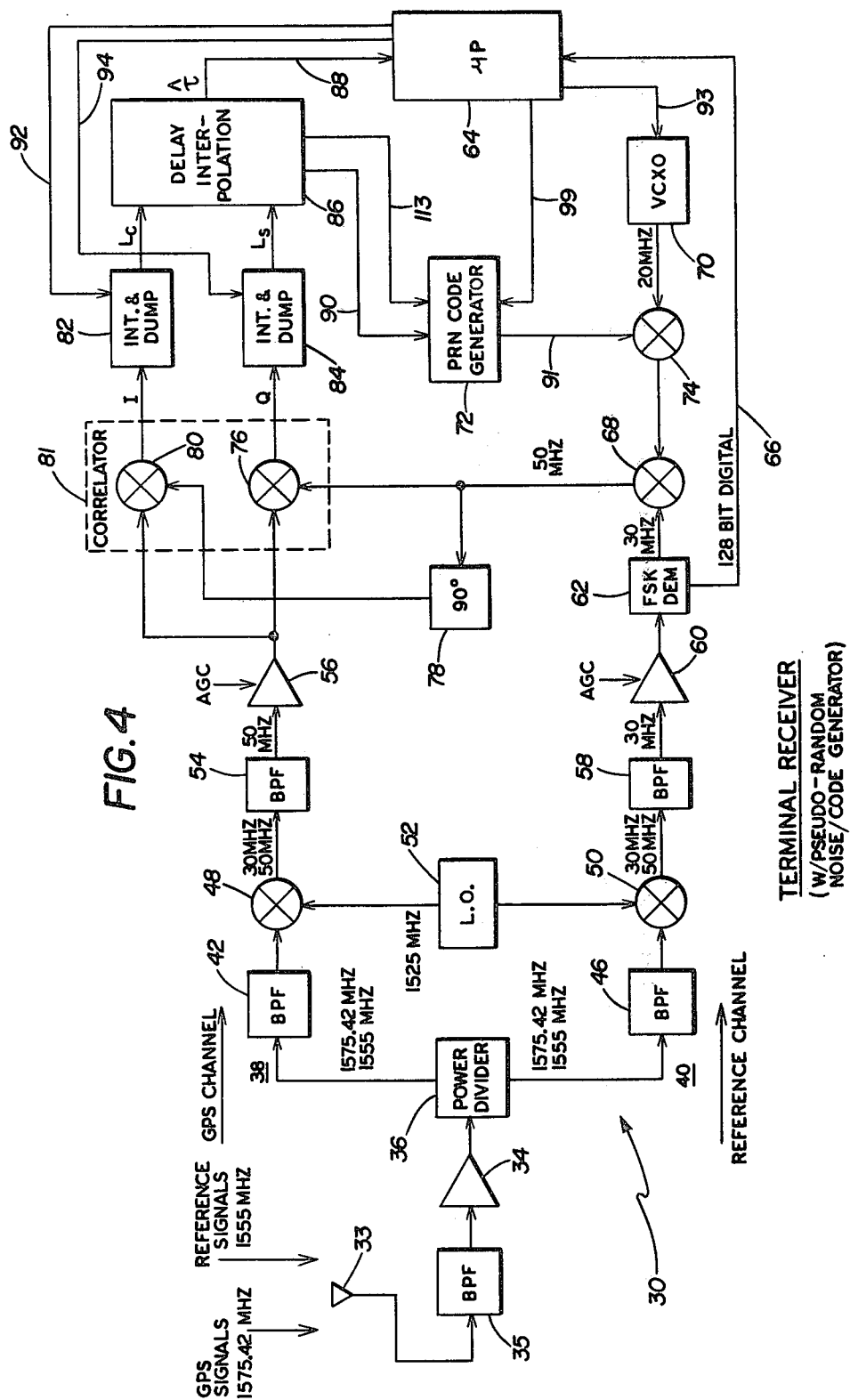
FIG. 4 is a block diagram of a receiver at a user terminal for receiving and processing the GPS channel and reference signal from the transmitter of FIG. 2.

As shown in FIG. 4, the complete aiding signal on the 1,555 MHz carrier, together with the GPS satellite signals on the 1,575.42 MHz channel, are received at the user terminal receiver 30 by a single antenna 33 such as a type CA-3224 antenna manufactured by Chu Associates, preferably having an essentially hemispherical coverage with 3 db nominal gain for elevation angles of at least 20 degrees above the horizon. Both signals are passed through a bandpass filter 35 before being amplified in a common wide-band RF preamplifier 34 having a bandwidth and gain sufficiently large to amplify both the GPS spread spectrum signal and FSK reference signal. The bandpass filter 35 should be located before preamplifier 34 so that out-of-band noise, such as radio frequency interference will be reduced. Power from the two signals is split equally by a power divider 36 to form an upper GPS channel 38 and a lower reference channel 40.

The GPS signal on channel 38 contains pseudo-random noise (PRN) signals from the GPS satellites to be correlated with a C/A PRN code generator 72 for user terminal position determination. The following table defines the C/A code format for the NAVSTAR/GPS satellite system. The C/A codes are continuously transmitted from the constellation of GPS satellites and continuously serially generated by the PRN code generator 72 in the receiver terminal. When a particular C/A PRN code in the receiver terminal is matched to an identical incoming C/A PRN code being transmitted by a particular GPS satellite, correlation occurs in the receiver terminal and is registered by the receiver microprocessor. When there is no correlation, the correlator rejects all other C/A codes and interfering signals.

| C/A CODE FORMAT FOR NAVSTAR/GPS | | | | |
|---|---|---|---|---|
| PRN Signal Assembly Number | GPS Space Vehicle (SV) Designation | Code Phase Selection C/A ($G2_i$) | Code Delay Chips C/A | First 10 Chips Octal C/A |
| 1 | Telecom Simulator | 2 ⊕ 6 | 5 | 1440 |
| 2 | NTS-2 | 3 ⊕ 7 | 6 | 1620 |
| 3 | QTV | 4 ⊕ 8 | 7 | 1710 |
| 4 | FSV-1 | 5 ⊕ 9 | 8 | 1744 |
| 5 | FSV-7 | 1 ⊕ 9 | 17 | 1133 |
| 6 | FSV-3 | 2 ⊕ 10 | 18 | 1455 |
| 7 | FSV-2 | 1 ⊕ 8 | 139 | 1131 |
| 8 | FSV-4 | 2 ⊕ 9 | 140 | 1454 |
| 9 | FSV-5 | 3 ⊕ 10 | 141 | 1626 |
| 10 | | 2 ⊕ 3 | 251 | 1504 |
| 11 | | 3 ⊕ 4 | 252 | 1642 |
| 12 | | 5 ⊕ 6 | 254 | 1750 |
| 13 | | 6 ⊕ 7 | 255 | 1764 |
| 14 | | 7 ⊕ 8 | 256 | 1772 |
| 15 | | 8 ⊕ 9 | 257 | 1775 |
| 16 | | 9 ⊕ 10 | 258 | 1776 |
| 17 | | 1 ⊕ 4 | 469 | 1156 |
| 18 | | 2 ⊕ 5 | 470 | 1467 |
| 19 | | 3 ⊕ 6 | 471 | 1633 |
| 20 | | 4 ⊕ 7 | 472 | 1715 |
| 21 | | 5 ⊕ 8 | 473 | 1746 |
| 22 | | 6 ⊕ 9 | 474 | 1763 |
| 23 | | 1 ⊕ 3 | 509 | 1063 |
| 24 | | 4 ⊕ 6 | 512 | 1706 |
| 25 | | 5 ⊕ 7 | 513 | 1743 |
| 26 | | 6 ⊕ 8 | 514 | 1761 |
| 27 | | 7 ⊕ 9 | 515 | 1770 |
| 28 | | 8 ⊕ 10 | 516 | 1774 |
| 29 | | 1 ⊕ 6 | 859 | 1127 |
| 30 | | 2 ⊕ 7 | 860 | 1453 |
| 31 | | 3 ⊕ 8 | 861 | 1625 |
| 32 | | 4 ⊕ 9 | 862 | 1712 |

Note: In the octal notation for the first 10 chips of the C/A code as shown in this column, the first digit (1) represents a "1" for the first chip and the last three digits are the conventional octal representation of the remaining 9 chips. (For example, the first 10 chips of the C/A code for PRN Signal Assembly No. 1 are: 1100100000 in binary and 1440 in octal). Legend: ⊕ is an "exclusive-or or modulo-two" adder.

The GPS channel and reference channel signals are filtered respectively in bandpass filters 42 and 46 before being down-converted to intermediate frequencies of 50 MHz and 30 MHz, respectively, in mixers 48 and 50, by a common local oscillator 52. Filters 42 and 46 are provided so that the input to 48 will contain only the GPS signals whereas the inputs to mixer 50 will contain only the reference signal. Local oscillator 52 may have relatively low stability because frequency drift of the local oscillator is common to both the GPS and reference channels and, therefore, does not affect code correlation. Whereas a local oscillator stability on the order of 1 part in $10^8$ is required in the NAVSTAR/GPS system, the stability requirement of corresponding local oscillator 52 in accordance with the invention may be relaxed to one part in $10^6$.

The GPS intermediate frequency signal (50 MHz±4 KHz maximum expected Doppler shift) at the output of mixer 48 is filtered in a bandpass filter 54 before being supplied to a first intermediate frequency amplifier 56. Filter 54 is one conventionally employed to reject harmonics generated by mixer 48. Similarly, the reference channel intermediate frequency signal is filtered by a bandpass filter 58 before being supplied to a second intermediate frequency amplifier 60. Both amplifiers 56 and 60 are automatic gain controlled to produce constant amplitude signals.

The acquisition-aiding reference signal at the output of IF amplifier 60 is noncoherently demodulated by a FSK demodulator 62 which uses a conventional phase locked loop (PLL) to strip from the 30 MHz carrier the 128 bit per second data to be supplied to a microprocessor 64 by a line 66. The 30 MHz carrier is injected in a mixer 68. The data supplied on line 66 to microprocessor 64 includes Doppler coefficient data which is determined from the appropriate receiver position known within ±150 km. This data is used to obtain Doppler offset values for each of the four GPS signals to be acquired, as will be explained in more detail in connection with FIG. 6. The Doppler terms, computed in microprocessor 64 in a conventional manner, are applied as a control signal to vary the frequency of a voltage controlled oscillator (VCXO) 70 having a nominal 20 MHz frequency. The output of VCXO 70 is mixed in mixer 74 with the appropriate 1,023 Mbps C/A code corresponding to a particular GPS satellite generated by a reference code generator 72. The 30 MHz reference carrier generated by FSK demodulator 62 is mixed in a mixer 68 with the C/A code modified VCXO signal for up-conversion to the GPS IF carrier frequency of 50 MHz.

The output of code generator 72, on line 91, is mixed with the Doppler compensated output of VCXO 70 in mixer 74 to adjust for the frequency of offset between the nominal GPS code center frequency in channel 38 and 1575.42 MHz. The output of mixer 74, which is at a nominal frequency of 20 MHz modified by the C/A code generated by code generator 72 and Doppler, is up-converted in mixer 68 to a frequency very close to the 50 MHz IF frequency of the virtual carrier of the GPS spread-spectrum code signal in channel 38 corresponding to 1575.42 MHz with a zero Doppler.

The output of mixer 68 is applied directly to one input of an in-phase mixer 76 and through a 90° phase shift network 78 to one input of a quadrature mixer 80. The pseudo-random code signal on channel 38 is supplied at the output of amplifier 56 to the second inputs of the two mixers 76 and 80. Mixer 80 generates an in-phase signal "I" to a first integrate-and-dump circuit 82 while the second mixer 76 generates a quadrature signal "Q" to a second integrate-and-dump circuit 84. Mixers 76 and 80 are balanced mixers that form correlator 81. Correlator 81 performs a correlation function for the GPS originated C/A codes and the internally generated code at code generator 72. The two integrate-and-dump circuits 82 and 84, controlled by microprocessor 64 over lines 92 and 94, dump at the chip rate in a conventional manner to generate signals $L_c$ and $L_s$ to be sampled to detect the largest correlation.

Figure 5:
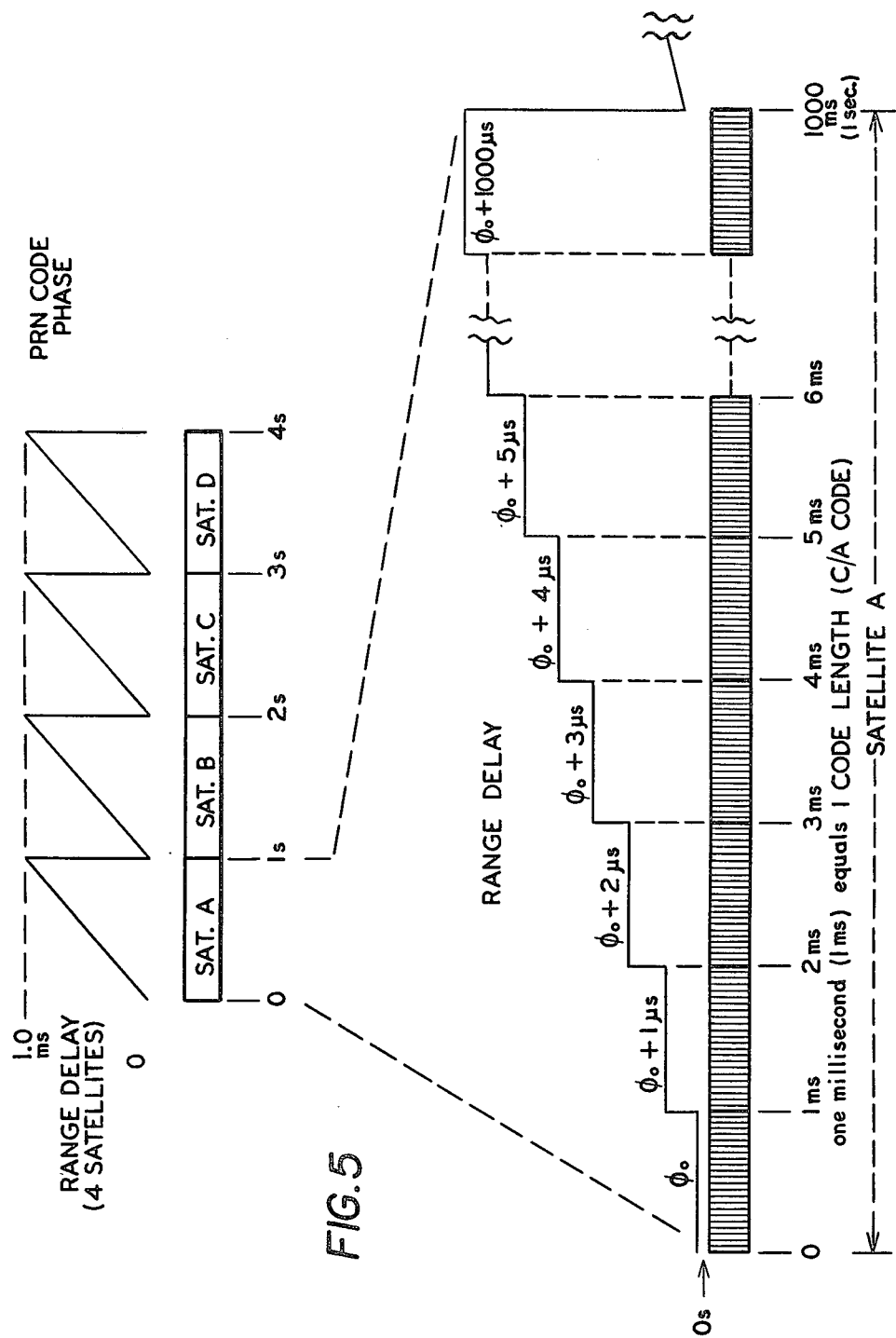
FIG. 5 is a diagram of the PRN code search sequence performed at the user terminal receiver for obtaining satellite range delay data.
Figures 6A, 6B:
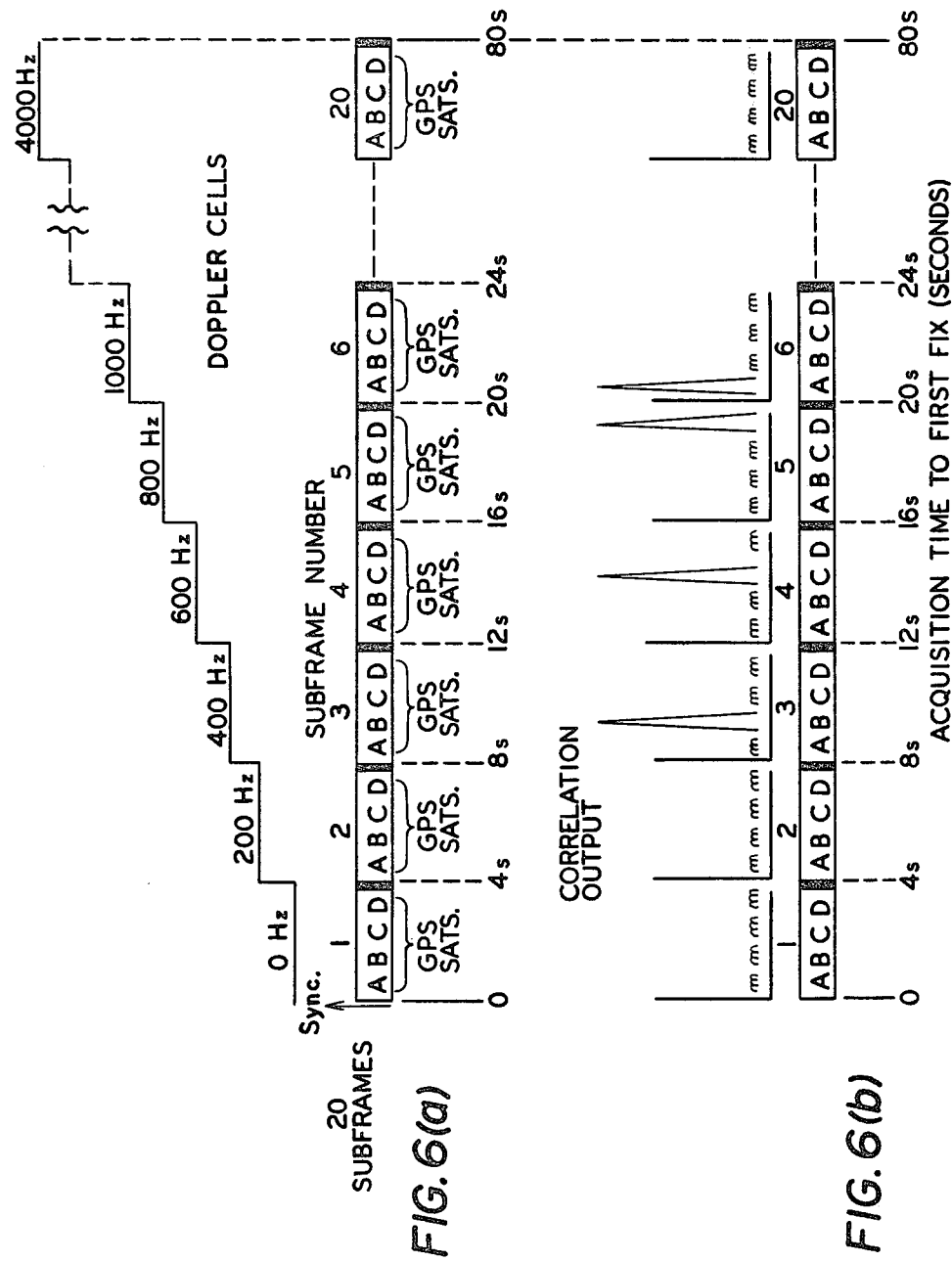
FIG. 6(*a*) is a diagram of a Doppler scan cycle gernerated by the user terminal receiver to compensate for Doppler shift associated with each GPS satellite given no prior knowledge of the terminal position.

In the signal acquisition mode, a PRN (pseudo-random noise) code frequency and phase search sequence, shown in FIG. 5 and FIG. 6, is employed. Doppler shifts from the NAVSTAR/GPS satellites are reduced essentially to zero by VCXO 70 under control of microprocessor 64, over line 93, before Gold code correlation can occur. As shown in FIG. 6(a), the Doppler frequency range of 4,000 Hz (±2,000 Hz over the continental United States) is typically scanned sequentially in 20 subframes of 200 Hz each. In the present example, 80 seconds are required to scan 4,000 Hz for GPS satellites A, B, C and D. The purpose of the Doppler scan during the signal acquisition mode is to determine which 200 Hz Doppler cell, shown in FIG. 6(a), contains the correct GPS satellite with a Doppler frequency shift within 200 Hz of that particular cell for compensation by VCXO 70. Alternatively, the Doppler gradient data (FIG. 3) on the FSK link, together with approximate knowledge of user position (with in ±150 km in pseudo-range distance between a GPS satellite and a user terminal) can be used in microprocessor 64 to set VCXO 70.

The code search sequence is controlled by microprocessor 64 over line 99 to cause the GPS Gold code signal in the GPS channel 38 and the PRN signal from the reference channel code generator 72 to be matched in time to within a fraction of a code chip period with the correct code for that satellite. At that time, code correlation occurs and the GPS satellite to user terminal pseudo-range can be computed. Reception is initiated by transmission of a synchronization epoch pulse every four seconds from the remote control station 12 via relay satellite 10. Typically, a total of four seconds is required to complete the PRN code search sequence (see FIG. 3) for satellites A, B, C and D in one Doppler cell.

Code correlation for GPS satellites A, B, C and D occurs in the manner shown in FIG. 6(b). Peak correlation for each satellite corresponding to associated Doppler shifts are shown in four-second subframes 3, 4, 5 and 6, corresponding respectively to GPS satellites B (400 Hz Doppler), C (600 Hz Doppler), D (800 Hz Doppler) and A (1,000 Hz Doppler). These Doppler shifts are compensated for in VCXO 70 at the start of each PRN search sequence shown in FIG. 5 associated with that satellite. A correlated output from integrate-and-dump circuits 82 and 84 is identified by a peak reading in a delay interpolation circuit 86 (FIG. 4).

Following code correlation peak acquisition, the outputs $L_c$ and $L_s$ of integrate-and-dump circuits 82 and 84 are supplied to delay interpolation circuit 86 to obtain code delay data to be applied on line 88 to microprocessor 64, as aforedescribed, for processing with the GPS satellite position coordinators supplied to the microprocessor on line 66 to compute user terminal position. The delay interpolation circuit 86 also generates a signal on line 90 to step the local code generator 72 in one chip steps to adjust for phase offset of the GPS satellite transmitted Gold code data on channel 38. The code step counter 112 generates a code chip reset signal on line 113 to the PRN code generator 72 (FIG. 4). It should be understood that although delay interpolation circuit 86 is illustrated in FIG. 4 as being a discrete circuit, the function of circuit 86 may be incorporated into microprocessor 64.

Figures 7, 8:
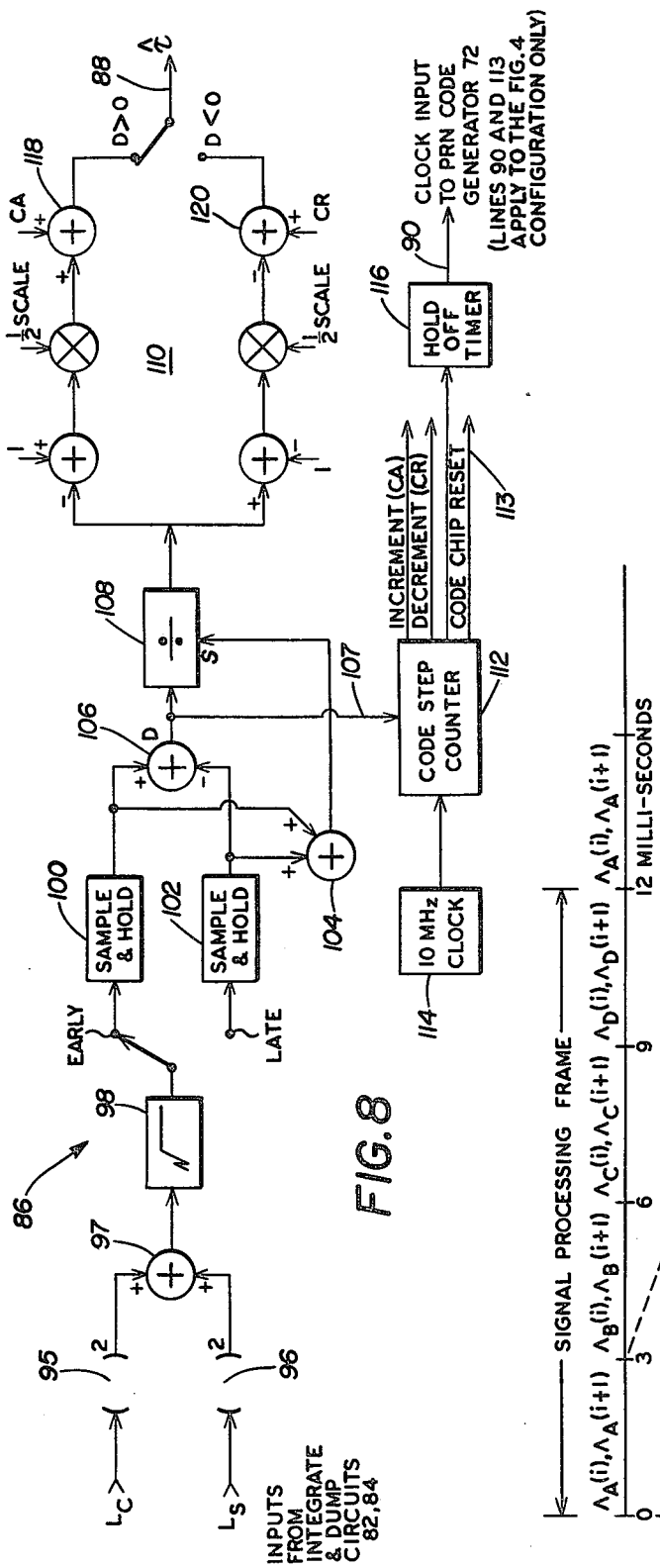
FIG. 7 is a diagram of the code delay interpolation sequence transmitted by the remote control station and used within the receiver during tracking.
FIG. 8 is a schematic diagram of interpolation circuitry for obtaining the user terminal's geographical position while tracking the C/A code.

Once tracking commences, index gates are continually available for each of the satellites A, B, C and D. These are maintained in the delay interpolation circuit in a repeat scan fashion whereby codes A, B, C and D are checked sequentially using the two closest values of step index, i and i+1. In all, eight statistics are generated and checked during each cycle. Here the process is repeated every 12 milliseconds, as depicted in FIG. 7. An interpolation scheme is then employed to generate the time delays used in position computation. This can be done because in the system of the present invention a punctual code is not required for GPS data demodulation. For satellite A, the time delay estimate is given by:

$$\tau_A = \hat{i}_A \Delta \tau + I_A \tag{1}$$

where:

$\hat{i}_A$ = code delay step index for satellite A;
$\Delta \tau$ = code delay time step size; and
$I_A$ = delay interpolation correction and assuming:

$$\Lambda_A(i,j) > \Lambda_A(i+1,j), \tag{2}$$

$$I_A = \left\{ 1 - \frac{[\Lambda_A(i,j)]^{\frac{1}{2}} - [\Lambda_A(i+1,j)]^{\frac{1}{2}}}{[\Lambda_A(i,j)]^{\frac{1}{2}} + [\Lambda_A(i+1,j)]^{\frac{1}{2}}} \right\} \frac{\Delta \tau}{2}$$

where:

$\Lambda_A$ = test statistic for satellite A generated with delay step i and VCXO step j. $\Lambda_A$ is related to $\sqrt{L_s^2 + L_c^2}$ The interpolation function $I_A$ is composed of the difference of two adjacent test statistics, normalized by a gain constant formed from their sum.

Delay interpolation circuit 86, in response to the outputs $L_c$ and $L_s$ of integrate-and-dump circuits 82 and 84, generates a signal $\hat{\tau}$ which is a number that is a fraction of a code chip length to provide finer code delay resolution than one chip.

Figure 10:
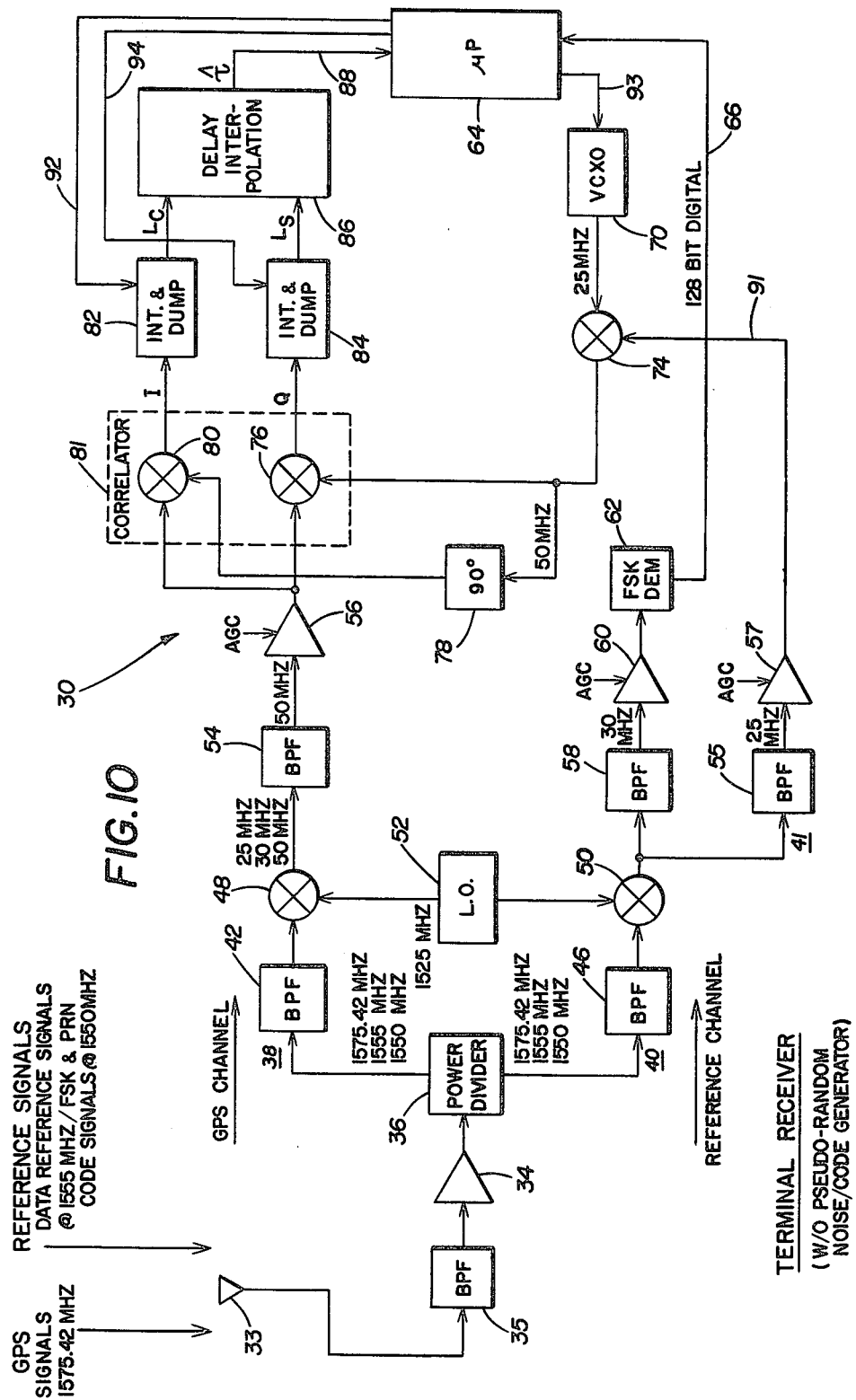
FIG. 10 is a block diagram of circuitry constituting an alternative embodiment of a receiver at a user terminal, for use with the transmitter of FIG. 9, for receiving and processing the aiding or reference signal, PRN code generator signals, and the GPS channel signals.

A diagram of one embodiment of delay interpolation circuit 86 is shown in FIG. 8 with inputs from integrate-and-dump circuits 82 and 84 as well as the circuit 86 being illustrated in FIG. 10. In FIG. 7, each signal processing frame has a duration of 12 milliseconds consisting of four subframes of 3 milliseconds each corresponding to each of the four satellites A, B, C and D.

During each subframe, there are two integrate-and-dump cycles corresponding to successive chips i, i+1, followed by the aforedescribed interpolation to obtain finer than integral chip delay resolution. Prior to each subframe, the frequency of VCXO 70 is set by microprocessor 64 to compensate for Doppler shift corresponding to a particular satellite, e.g., satellite A, followed by setting of code generator 72 to the code delay closest to the GPS satellite code delay as determined by the immediately preceeding frames. Following the two integration cycles on successive chips i, i+1, for satellite A, and following interpolation, a correlation and interpolation cycle is made on satellite B in a like manner, and so on, until the cycle repeats, beginning with satellite A.

The output $L_c$ from integrate-and-dump circuit 82 is squared in a circuit 95 whereas the output $L_s$ of integrate-and-dump circuit 84 is squared in a circuit 96. The two signals on the outputs of squaring circuits 95 and 96 are summed in an adder 97 and supplied to a square-root computation circuit 98 before being multiplexed between sample and hold circuits 100 and 102, 102 having an inverter amplifier, so as to generate sum terms in a circuit 104 and difference terms in a circuit 106.

The difference terms generated by circuit 106 are scaled down in a divider circuit 108 by the sum terms generated by summer circuit 104. The scaled difference terms are supplied to an interpolation circuit, generally indicated by 110, wherein the difference term is added or subtracted from the present code store index in microprocessor 64 (FIG. 4), producing an interpolated delay with very fine resolution compared to the coarse delay stepping of code generator 72. In carrying out this delay interpolation for the receiver of FIG. 4, the C/A code generator 72 is to be maintained in step, in a coarse fashion, with the GPS C/A code sequence received on the GPS channel 38. The stepping function is performed by supplying the difference signal at circuit 106 to a code step counter 112, triggered by a clock 114 which may be contained in microprocessor 64 and controlled by the difference term D appearing on line 107 such that a positive term (+D) causes an advance count in the counter and a negative term (−D) causes a down or retard count. These advance/retard pulses are accumulated in counter 112 to correct the code generator step in the next signal processing subframe by delaying transfer of the correction pulses in a hold off timer 116. The output of hold off timer 116 is the clock input on line 90 which is furnished to the PRN code generator 72 in FIG. 4. The code chip preset line 113 selects the proper PRN code chip that is stored in the code step counter 112 for the C/A code generator 72.

As previously described, the scaled difference term is also supplied to interpolation circuit 110 which is controlled at summer circuits 118 and 120 by code step counter 112 depending upon the polarity of difference term D in accordance with equations (1) and (2), supra. The output of interpolation circuit 110, line 88, is employed in the microprocessor 64 to calculate user terminal position based upon GPS satellite locations. These satellite locations are supplied in the form of satellite position spatial coordinates to the microprocessor on line 66 from the demodulated FSK aiding signal.

In the position fixing mode of operation of the receiver, the receiver must convert estimated code arrival times into user position. The solution depends upon a knowledge of GPS satellite positions at the instant of ranging code transmission. Microprocessor 64 keeps track of these positions by monitoring the demodulated FSK data stream on line 66 (FIG. 4) which contains direct coordinate information referenced to the GPS C/A code period emitted at epoch time $T_{RS}$. The reference channel approach in accordance with the invention eliminates the need for satellite dynamic models and associated computations required in the standard GPS receiver. Thus, the invention contemplates moving data processing complexity from a plurality of receiver terminals to a single remote control station transmitter, in particular, to controller 26 as shown in FIG. 2.

In visualizing the various event times, it is helpful to view each C/A code period of 1,023 chips as a single pulse emitted by the GPS satellite at the onset of that period. Every four seconds the microprocessor 64 defines one of these synchronous emission times as having occurred at epoch time $T_{RS}$. If one set of pulses were emitted by the GPS satellites every four seconds, and if the receiver could measure the arrival times on parallel channels, the signal arrival times for GPS satellites A, B, C and D would be:

$$\tau_A = |r_0(\tau_A) - r_A(T_{RS})|/c + T_{RS} \qquad (3)$$

$$\tau_B = |r_0(\tau_B) - r_B(T_{RS})|/c + T_{RS} \qquad (4)$$

$$\tau_C = |r_0(\tau_C) - r_C(T_{RS})|/c + T_{RS} \qquad (5)$$

$$\tau_D = |r_0(\tau_D) - r_D(T_{RS})|/c + T_{RS} \qquad (6)$$

where:
A–D are theoretical code step delay values;
$\hat{r}_0$ is user terminal position;
$r_{A-D}$ are GPS satellite positions;
$T_{RS}$ is code epoch event time; and
c is propagation velocity.
The observed delay estimates, i, are equated to the above theoretical delay values to get:

$$\hat{\tau}_A = |\hat{r}_0(\tau_A) - r_A(T_{RS})|/c + \hat{T}_{RS} \qquad (7)$$

$$\hat{\tau}_B = |\hat{r}_0(\tau_B) - r_B(T_{RS})|/c + \hat{T}_{RS} \qquad (8)$$

$$\hat{\tau}_C = |\hat{r}_0(\tau_C) - r_C(T_{RS})|/c + T_{RS} \qquad (9)$$

$$\hat{\tau}_D = |\hat{r}_0(\tau_D) - r_D(T_{RS})|/c + \hat{T}_{RS} \qquad (10)$$

In solving equations (3)–(10), it is assumed that user position $r_0$ is constant between pulse arrival times and that GPS satellite positions at the reference time are accurately known. The latter information is encoded directly with data blocks A–D (FIG. 3). In solving for $r_0$, the microprocessor 64 also provides the paramenter $T_{RS}$. In practice, each coordinate may be encoded with 23 bit accuracy, for an error of about 2 meters. A time of day word encoded at the start of each data block shown in FIG. 3 may be used to set the user clock with that of the ground station 12.

Thus, the reference channel approach to NAVSTAR/GPS, as set forth in accordance with this disclosure, simplifies user equipment in all three modes of operation by eliminating delay lock tracking and Costas phase-lock loops, relaxing receiver front-end local oscillator long term stability requirements and reducing data processing requirements.

The major microprocessor 64 software functions identified in the description are summarized as follows: FSK Data Channel Buffering; Acquisition Mode Control; Tracking Mode Control; and Position Fixing Determination.

Regarding the FSK data channel buffering, by the use of standard serial data buffering techniques this routine monitors line 66 (FIGS. 4 and 10) to obtain bit and word synchronization. The synchronization word and data stream are as illustrated in FIG. 3. Data and sync word timing are stored for use in the routines described below.

As to the acquisition mode control, this routine is responsible for control of VCXO 70, integrate-and-dump circuits 82 and 84 and code generator 72. Data previously stored for the FSK data channel buffering is used to identify which codes are to be selected. Corresponding to each of these, the algorithm computes a VCXO offset step by any of three methods. Firstly, given approximate knowledge of position the Doppler gradient words obtained from the FSK data channel can be used in a lookup table-interpolation scheme. The second method, similar to that of a conventional GPS receiver, requires a computation of user-to-GPS satellite range rate. In this approach GPS satellite velocities are obtained directly by differencing satellite positions from adjacent 4-second FSK data blocks. The third approach, appropriate for the case of no prior knowledge of position, employs the fixed Doppler scan of FIG. 6(a).

During acquisition, following each setting of the VCXO code step command, the code step format of FIG. 5 is generated. Simultaneously, the integrate-and-dump circuits are controlled through lines 92 and 94. Line 88 is monitored for a voltage above some threshold. Those GPS satellites among the selected set for which acquisition is detected are passed to the tracking mode.

The tracking mode control monitors the delay interpolation output 88 to insure that signal detection remains valid. The most recent interpolation values are stored for further processing as described hereinafter. If tracking under control of delay interpolation circuit 86 fails, this routine forces the code generator back into the code scanning mode associated with the acquisition mode control routine.

Given the delay interpolation circuit outputs, including interpolation value and present code step, as well as FSK sync word arrival time measurement, the position fixing determination routine finds the terminal's geographical position and may be employed to synchronize the terminal clock to GPS time. Two position fixing algorithms are possible. The first, appropriate when the user has some prior knowledge of position, employs a standard iterative solution scheme for solving equations (7)–(10). The second, appropriate in the case of no prior knowledge of position, the algorithm must first ascertain which C/A code period emitted from each GPS satellite corresponds to the time-of-arrival measured in the delay interpolation circuit. The removal of this one millisecond ambiguity is, in the conventional GPS receiver, accomplished by demodulating the GPS quadrature phase shift key (QPSK) 50 bit per second data channel to obtain GPS time. In the aided terminal of this invention, the user with no prior position knowledge would first complete the Doppler scan of FIG. 6(a). Then the Doppler cells with peak values would be compared with the Doppler gradient terms provided on the FSK data stream as shown in FIG. 3 to obtain a rough estimate of position. The 150 km code ambiguity may then be removed. Upon completion of the C/A code period ambiguity removal, a position fixing determination is made.

Figure 9:
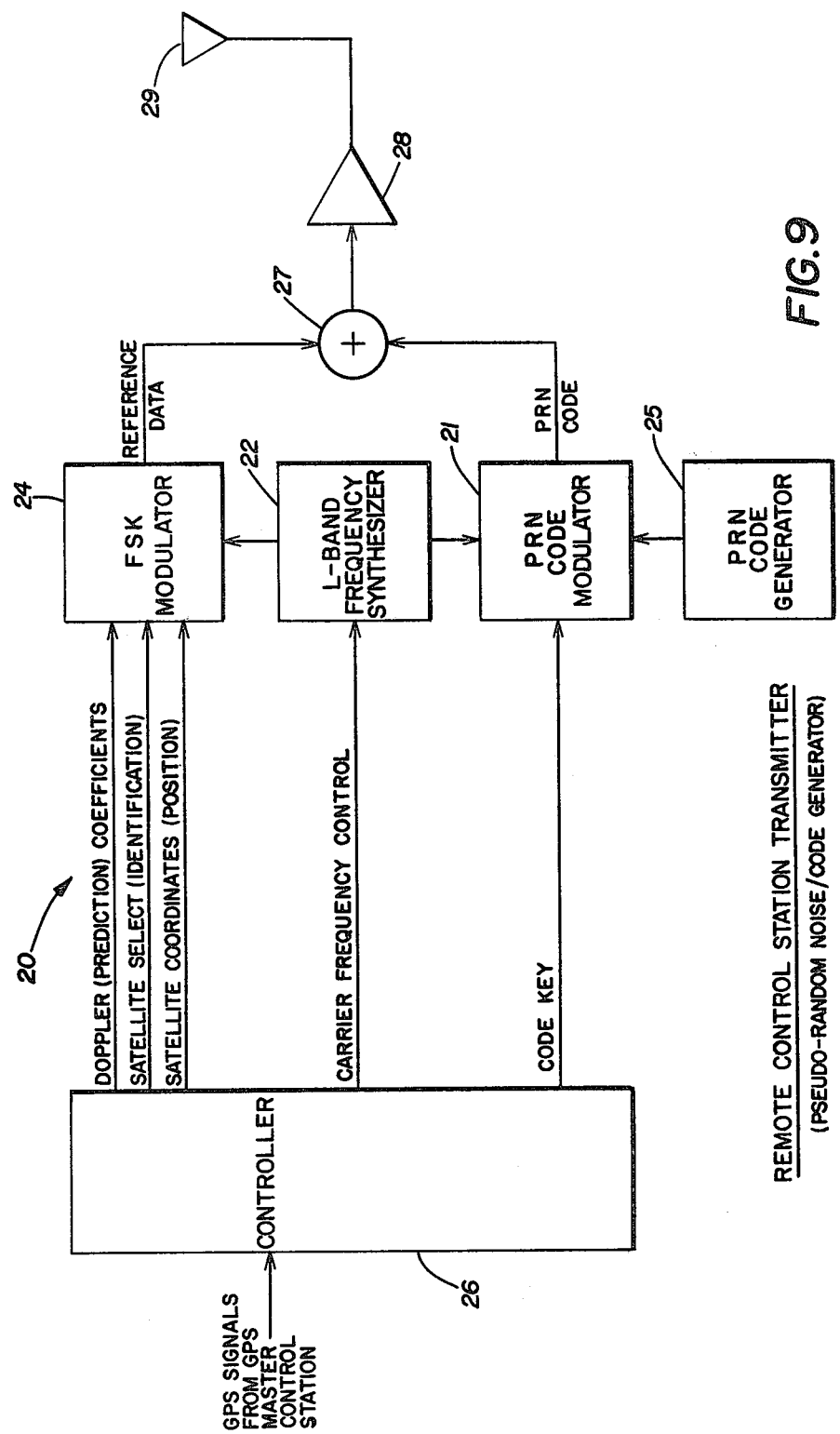
FIG. 9 is a block diagram of circuitry constituting an alternative embodiment of a transmitter for transmitting the PRN code generator signals, and an aiding or reference signal to be received together with GPS channel signals at the user terminal.

The advantages of employing a transmitter to provide a reference channel signal which will allow for the simplification of receivers in civilian terminals may also be achieved in a second embodiment of the invention depicted in FIGS. 9 and 10. FIG. 9 shows a transmitter 20 which is similar to that shown in FIG. 2 except that the transmitter of FIG. 9 has, in addition, a scanning PRN code generator 25. This eliminates the need for a PRN code generator 72 in each receiver as shown in FIG. 4. The output of the transmitter 20 of FIG. 2 is an FSK signal at a nominal 128 bit per second rate which contains a conventional mark-space, or digital one zero, format containing serial data as previously described with respect to FIG. 3. The transmitter of FIG. 9, in addition to the FSK signal generated by the FIG. 2 transmitter, also transmits, in parallel with that FSK signal, a modulated PRN code signal on a separate subcarrier.

In similar fashion to the transmitter 20 of FIG. 2, controller 26 of FIG. 9 accepts as an input GPS signals from the GPS master control station which are transmitted, for instance, by a land line or GPS signals directly from the GPS satellites. Again, the controller 26 responds to these signals by developing and outputting Doppler coefficients, satellite select, satellite coordinates, carrier frequency control, and, in this instance, code key signals which are derived from the satellite select signals. PRN code modulator 21 accepts signals from the PRN code generator 25 and from the L-band oscillator 22 which are essentially in the form of a 1,555 MHz frequency sinusoid. The modulated PRN code output signal is offset by about 5 MHz below the L-band oscillator signal to about 1,550 MHz to form a subcarrier. The 5 MHz offset frequency signal is generated by a subcarrier generator contained within modulator 21, which is not shown. The subcarrier is, in turn, controlled by the code key signal which may be a digital word indicating which of four GPS satellites are within the best view of a given terminal, thereby placing the selected PRN C/A code under control of the code key signal. The code key signal will provide a given code burst for slightly longer than one second to enable code generation for a particular satellite. Within the 1-second burst the code is stepped as shown in FIG. 5.

The L-band oscillator 22, which operates at 1,555 MHz, requires accurate vernier frequency control which is maintained by the carrier frequency control signal which, in turn, originates in the controller 26 and is inputted to the oscillator. This signal may take the form of a varying D.C. voltage, a digital format, or other suitable control signal.

The 1,555 MHz output signal from the L-band oscillator 22 also forms an input to the FSK modulator 24 along with the Doppler coefficient and satellite select signals from controller 26. The data format, discussed previously, is shown in FIG. 3. The Doppler coefficient signal identifies the correct Doppler cell frequency offset for the satellites in view, so that each terminal receiver having some prior knowledge of position may quickly identify the correct Doppler cell to off-set the Doppler frequency to zero rather than requiring a much longer time to perform scanning as shown in FIG. 6(a) and (b). The satellite signal is a digital signal which allows the selection of the correct PRN codes to match the best four satellites in view. The data reference signal output from the FSK modulator 24 and the modulated PRN code signal output from modulator 21 are simultaneously applied to a linear adder 27 whose output is, in turn, applied to the linear power driver amplifier 28. The output of amplifier 28 is, in turn applied to antenna 29.

Signals from antenna 29 may radiate to the receiver terminals directly, in which case, the antenna may be omnidirectional. If, however, longer range is desired, antenna 29 may be directive and employed to transmit to a relay tower whose antenna would radiate signals to the receiver terminals. If even greater range is required, signals would be transmitted from antenna 29, which would be highly directive, to a geostationary satellite employed as a relay station.

FIG. 10 illustrates a receiver 30 for the second embodiment of the invention which may be employed with the transmitter shown in FIG. 9. This receiver is essentially the same as that shown in FIG. 4 except that the PRN code generator 72 in the FIG. 4 receiver has been removed from the receiver of FIG. 10 and relocated in the transmitter of FIG. 9. In both embodiments, the PRN code generator, is, in essence, the same, the difference between the FIGS. 2, 4 system and the FIGS. 9, 10 system being that the latter requires only one code generator per system as opposed to requiring a code generator in each receiver terminal. The function of the code generator is the same in both cases, i.e., to provide a reference code source for phase correlation with the incoming PRN codes from the GPS satellites for which there is a unique code for each satellite. Thus, in the FIGS. 9, 10 system, additional circuit complexity is transferred from the receiver terminals to the transmitter. This system would find application if a governmental unit, or other organization, would find it in its interest to provide a central transmitter with receivers being purchased by civil users for radio navigation or other uses. The receiver of FIG. 10 would, however, require an additional channel 41 including bandpass filter 55 and amplifier 57. The preferred embodiment is that of the FIGS. 2, 4 system, in terms of performance, all other things being equal, because propagation noise and fading would not effect the receiver of FIG. 4 in terms of code reception because the code is internally generated. Further, this receiver can achieve a higher fix rate since it is not tied to the fixed code scan shown in FIG. 5.

As with the receiver of FIG. 4, the receiver of FIG. 10 has as one input a signal in FSK format at 1,555 MHz designated as the data reference signal in FIG. 9. In addition, it receives the modulated PRN code signals, also from the transmitter of FIG. 9, at the subcarrier frequency of 1,550 MHz, the latter signal not being present in the system of FIGS. 2 and 4. The receiver of FIG. 10 also simultaneously receives the GPS satellite signals at 1,575.42 MHz.

These signals are received by antenna 33, which may be hemispherical, preselector filtered in bandpass filter 35 and amplified in wide band low noise preamplifier 34. The preselector filter preferably has a mid-band insertion loss of not more than 3 db to maintain a low system thermal noise figure. Preamplifier 34 drives power divider 36 which splits signal power equally into a GPS channel 38 and reference channel 40, these channels being respectively connected to filters 42 and 46. Bandpass filters 42 and 46 are microwave filters placed in the receiver for the purpose of image frequency and noise rejection. These filters may be replaced by a single filter placed between preamplifier 34 and power divider 36. The outputs of filters 42 and 46 are connected to mixers 48 and 50 which are driven by local oscillator 52 at about 1525 MHz to produce nominal 25 MHz, 30 MHz and 50 MHz intermediate frequency signals present in each channel.

The output of mixer 48 is fed to bandpass filter 54 having a nominal 50 MHz center frequency and a bandwidth of at least 2 MHz, one that is sufficient to pass the GPS C/A code while rejecting the FSK and PRN intermediate frequencies of 30 MHz and 25 MHz. The 50 MHz signal is then applied to AGC amplifier 56. The output of mixer 50 is applied to both bandpass filters 55 and 58. Bandpass filter 58 requires a nominal 30 MHz center frequency and at least a 10 KHz bandwidth while filter 55 requires a nominal 25 MHz center frequency and at least a 2 MHz bandwidth. Because of the 2 MHz bandwidth requirement in the 25 MHz channel, some feed-through from the 30 MHz FSK signal may enter the 25 MHz channel but will be rejected during the code correction process. The outputs of bandpass filters 55 and 58 are connected to AGC amplifiers 57 and 60, respectively, which are, in turn, connected to mixer 74 and demodulator 62 respectively. The AGC amplifiers all have as an input a varying D.C. feedback control voltage originated from a detector placed in each respective channel (not shown).

Figure 11:
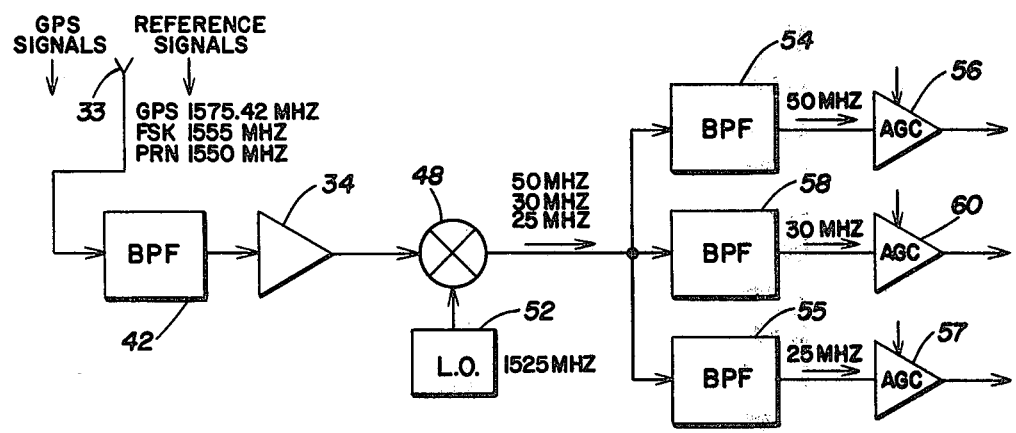
FIG. 11 is a block diagram of circuitry constituting an alternate front-end for use in the receiver of FIG. 10.

A simplified receiver front-end that may be used is shown in FIG. 11. The GPS and PRN/FSK reference signals enter antenna 33 which drives preamplifier 34 prior to being preselector filtered by bandpass filter 42. The advantage of preselector filtering is to reduce out-of-band, radio frequency interference (RFI). In turn, the preamplifier drives mixer 48 which is also driven by local oscillator 52 operating at 1525 MHz. The output of the mixer contains 50 MHz, 30 MHz and 25 MHz intermediate frequency signals and is connected to parallel bandpass filters 54, 58 and 55 which pass the 50 MHz, 30 MHz and 25 MHz signals, respectively. In turn, these latter signals drive AGC amplifiers 56, 60 and 57, respectively.

Referring again to FIG. 10, the 50 MHz output of AGC amplifier 56 is applied to one input each of balanced mixers 76 and 80. At the same time, the 30 MHz output of AGC amplifier 60, containing the FSK modulated reference signal information, is applied to the FSK demodulator 62. The demodulator strips the FSK modulation signal off the input and develops a 128 bit digital signal representing the FSK modulation. The output of mixer 74 is applied directly to a second input of balanced mixer 76 and is applied indirectly to a second input of balanced mixer 80 after passing through a 90° phase shift network 78. The two balanced mixers 76, 80, thus connected, form correlator 81. The output of AGC amplifier 57, containing the 25 MHz modulated PRN C/A code, as prefiltered by bandpass filter 55, is applied directly to mixer 74 on line 91. Correlator 81, therefore, will perform a correlation function between the incoming stepped PRN C/A code in the reference channel, as shown in FIG. 5, and the incoming GPS C/A ranging code, to determine the range closest to a phase delay step for which the PRN C/A code correlates. It should be clear that the FIG. 10 receiver has substituted the PRN C/A code 25 MHz channel to receive and filter the transmitted PRN C/A code rather than provide a PRN C/A code generator, as shown in FIG. 4 at block 72, which drives mixer 74 in the same fashion as does the PRN code AGC amplifier 57 in FIG. 10. At this point it may be seen that the front end of the receiver of FIG. 10 is essentially the same as that provided by the receiver of FIG. 4 except for channel 41 which furnishes the PRN code from the transmitter at an intermediate frequency. The rear end of the receiver of FIG. 10 is essentially the same as that provided by the receiver of FIG. 4 except that it employs the PRN code from channel 41 instead of having its own, self-contained PRN code generator.

It should be noted that the delay interpolation circuit of the receiver in FIG. 10 does not generate code step advance and retard commands. The code reference waveform is provided by the remote control station (FIG. 9) with the scan shown in FIG. 5. Thus, the maximum user terminal update rate is once every 4 seconds. The integrate-and-dump timing synchronization is obtained from the synchronization pulse received on the FSK data stream as shown in FIG. 3. Each PRN Gold code signal from GPS satellites A, B, C and D is phase-scanned sequentially as shown in FIG. 5 in 1,000 one-microsecond phase steps. During the reference transmission code, phase $\phi$ is held constant over each one millisecond period which is equivalent to range delay for the GPS C/A PRN Gold code (1,023 Mb/s rate). At the end of each one-millisecond period, when the reference transmission code phase step is advanced by one microsecond, microprocessor 64 controls sampling of the integrate-and-dump circuits 82 and 84, followed by resetting, thereby resulting in a sequence of 1,000 integrated steps over a one second period.

It should be also noted that the code step interpolation method of FIG. 8 is also employed for the receiver of FIG. 10. The position fixing method is identical with the receiver of FIG. 4.

The invention, as described herein, is capable of a myriad of variations, a few of which now are identified.

The system employing the transmitter 20 of FIG. 2 and the terminal receiver of FIG. 4, where the C/A PRN code is generated within each receiver, may be employed to aid the trucking industry on a nationwide basis. A geostationary reference satellite may be employed to relay the acquisition aiding signals from one or more remote control stations. The satellite would be used as a relay station as one method of obtaining nationwide coverage. The receiver configuration of FIG. 4 is preferred in the application, because it allows the use of a narrow band down-link, with a lower EIRP, from the satellite which would be on the order of 10 KHz bandwidth compared to a 2 MHz-wide broad band down-link, if the C/A PRN code was transmitted as described in the embodiment of FIGS. 9 and 10. Trucks carrying a terminal typically may have visible or audible indicators but the various remote control stations would receive data relating to the trucks position, at a particular time, from a report-back transmitter located in each truck with a terminal. In this application, the user terminal may, but need not, compute its own position. It could merely send back psuedo-range information directly to the remote control station.

The system of FIGS. 9 and 10, with the C/A PRN code generated and transmitted in and by, most likely, a single transmitter, and using a local tower, several hundred feet high, as a relay station, may be used for municipal police coverage. In this application, the tower could have a broad band down-link without its EIRP requirements being too large because of its intended local coverage. Patrol cars with receiver terminals typically would have a visible readout of their geographical positions as would the one or more remote control stations that would receive their input data from report-back links located in each patrol car (not shown).

The system of FIGS. 9 and 10, with the C/A PRN code generated in and by the transmitter and using one or more towers as relay stations, depending on coverage required, may be used as a navigation aiding system for waterways. The tower, or towers, would have broad band down-links with moderate EIRP. The information furnished by this system could be substituted for Loran-C system information which is accurate to about 1/10 to ½ mile while the inventive system disclosed herein is accurate to within about 100 meters. If more accuracy is required, the system may be made to employ the 10.23 mega-bit per second "P" code generated by the GPS satellite system. Using the "P" code, accuracy could be made to be within 12 meters. In this system, the individual maritime vessels would require a visible readout of their location from their receiver terminal. As an option, a report-back feature may be provided to enable a remote control station to perform various computations and report back instructions to each vessel with collision avoidance information.

In addition to providing position data associated with the user terminal, auxiliary information of interest to civilian users could be provided on the reference channel, such as weather or radio propagation data or distress data associated with users in a region serviced by remote control station 12 or associated with particular user position coordinates.

It will be readily apparent to those skilled in this art from the detailed description and drawings that which is shown and described is only the preferred emodiment of the invention and the best mode contemplated for carrying out the invention. The invention, therefore, is capable of other and different embodiments, and its several details are capable of modifications in various obvious respects, all without departing from the invention. Accordingly, the drawings and description are to be regarded as illustrative in nature, and not as restrictive.

We claim:

1. A system for determining the position of a user terminal comprising:
   means remote from said user terminal for transmitting a signal containing information indicative of the location of the signal transmitting means, almanac data, timing and synchronization data (epoch) and clock correction data; and
   means remote from said signal transmitting means and said user terminal for receiving said transmitted signal and converting said transmitted signal to an aiding signal containing information which identifies said signal transmitting means as well as the spatial coordinate data and predicted Doppler data for said signal transmitting means, said receiving means transmitting said aiding signal to said user terminal;
   said signal transmitting means also transmitting said signal to said user terminal.

2. The system of claim 1 wherein said signal transmitting means includes a plurality of signal sources which are displaced from each other.

3. The system of claim 2 wherein said plurality of signal sources are a constellation of satellites.

4. The system of claim 1 wherein said aiding signal is transmitted with frequency shift key (FSK) modulation.

5. The system of claim 1 wherein said aiding signal is transmitted to said user terminal via a relay tower.

6. The system of claim 1 wherein said aiding signal is transmitted to said user terminal via a relay satellite.

7. The system of claim 1 wherein said aiding signal includes a stepped pseudo-random (PRN) code reference.

8. The system of claim 1 wherein said user terminal includes a receiver with a pseudo-random (PRN) code generator.

9. A method for determining the position of a user terminal comprising:
   transmitting a signal containing information indicative of the location of the signal source, almanac data, timing and synchronization data (epoch) and clock correction data;
   receiving said signal at said user terminal;
   receiving said signal at a location remote from said signal source which is also remote from said user terminal;
   converting said signal at said remote location to an aiding signal containing information which identifies said signal source as well as the predicted Doppler data and the spatial coordinate data for said signal source;
   transmitting said aiding signal to said user terminal.

10. The method of claim 9 wherein said transmitted signal consists of a plurality of signals originating from displaced sources.

11. The method of claim 10 wherein said displaced sources are a constellation of satellites.

12. The method of claim 9 wherein said aiding signal is transmitted with frequency shift key (FSK) modulation.

13. The method of claim 9 wherein said aiding signal is transmitted to said user terminal via a relay tower.

14. The method of claim 9 wherein said aiding signal is transmitted to said user terminal via a relay satellite.

15. The method of claim 9 wherein said aiding signal includes a stepped pseudo-random (PRN) code reference.

16. The method of claim 9 wherein said user terminal includes a receiver with a pseudo-random (PRN) code generator.

17. In a system for determining the position of a user terminal including:
   (1) means remote from said user terminal for transmitting a signal containing information indicative of the location of the signal transmitting means, almanac data, timing and synchronization data (epoch) and clock correction data; and
   (2) receiving means at said user terminal for receiving said transmitted signal:
   the improvement in said system comprising:
   (1) means remote from said signal transmitting means and said user terminal for receiving said transmitted signal and converting said transmitted signal to an aiding signal containing information which identifies said signal transmitting means as well as the predicted Doppler data and the spatial coordinate data for said signal transmitting means; and
   (2) means for transmitting said aiding signal to said user terminal;
   whereby the complexity of said receiving means may be relaxed.

18. The system of claim 17 wherein said signal transmitting means includes a plurality of signal sources which are displaced from each other.

19. The system of claim 18 wherein said plurality of signal sources are a constellation of satellites.

20. The system of claim 17 wherein said aiding signal is transmitted with frequency shift key (FSK) modulation.

21. The system of claim 17 wherein said aiding signal is transmitted to said user terminal via a relay tower.

22. The system of claim 17 wherein said aiding signal is transmitted to said user terminal via a relay satellite.

23. The system of claim 17 wherein said aiding signal includes a stepped pseudo-random (PRN) code reference.

24. The system of claim 17 wherein said user terminal includes a receiver with a pseudo-random (PRN) code generator.

* * * * *